United States Patent
Panchal et al.

(10) Patent No.: US 8,995,527 B2
(45) Date of Patent: Mar. 31, 2015

(54) BLOCK TYPE SIGNALLING IN VIDEO CODING

(75) Inventors: Rahul P. Panchal, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 521 days.

(21) Appl. No.: 13/029,967

(22) Filed: Feb. 17, 2011

(65) Prior Publication Data

US 2011/0206123 A1 Aug. 25, 2011

Related U.S. Application Data

(60) Provisional application No. 61/306,261, filed on Feb. 19, 2010.

(51) Int. Cl.
*H04N 19/70* (2014.01)
*H04N 19/577* (2014.01)
*H04N 19/147* (2014.01)
*H04N 19/109* (2014.01)

(52) U.S. Cl.
CPC ............ *H04N 19/577* (2014.01); *H04N 19/70* (2014.01); *H04N 19/147* (2014.01); *H04N 19/109* (2014.01)
USPC .................................................. 375/240.15

(58) Field of Classification Search
None
See application file for complete search history.

(56) References Cited

U.S. PATENT DOCUMENTS

| | | | |
|---|---|---|---|
| 7,894,530 B2 * | 2/2011 | Gordon et al. | 375/240.18 |
| 8,184,716 B2 * | 5/2012 | Kodama et al. | 375/240.24 |
| 8,457,200 B2 * | 6/2013 | Andersson et al. | 375/240.12 |
| 2005/0094726 A1 * | 5/2005 | Park | 375/240.08 |
| 2005/0249290 A1 | 11/2005 | Gordon et al. | |
| 2008/0075170 A1 * | 3/2008 | Henocq et al. | 375/240.16 |
| 2008/0267293 A1 | 10/2008 | Swami et al. | |
| 2009/0003449 A1 * | 1/2009 | Sekiguchi et al. | 375/240.16 |
| 2009/0041122 A1 * | 2/2009 | Kodama et al. | 375/240.12 |
| 2009/0097558 A1 | 4/2009 | Ye et al. | |
| 2009/0245373 A1 * | 10/2009 | Tourapis et al. | 375/240.15 |

(Continued)

FOREIGN PATENT DOCUMENTS

| | | | |
|---|---|---|---|
| JP | 2006287315 A | 10/2006 | |
| JP | 2007202150 A | 8/2007 | |

(Continued)

OTHER PUBLICATIONS

ITU-T H.264 Document, Advanced video coding for generic audio-visual service, May 2003.*

(Continued)

*Primary Examiner* — Jayanti K. Patel
*Assistant Examiner* — Reza Aghevli
(74) *Attorney, Agent, or Firm* — John Rickenbrode

(57) ABSTRACT

In one example, this disclosure describes video encoding and decoding techniques applicable to bi-directional prediction. For signaling from an encoder to a decoder a block type for a video block, an encoder can transmit to the decoder two or more separate syntax elements, where one of the two or more separate syntax elements identifies a partition size for the video block and another of the two or more separate syntax elements identifies a prediction direction for a partition of the video block. The separate syntax elements can be individually encoded and transmitted from the encoder to the decoder.

54 Claims, 6 Drawing Sheets

(56) References Cited

U.S. PATENT DOCUMENTS

| | | | |
|---|---|---|---|
| 2009/0257492 A1* | 10/2009 | Andersson et al. | 375/240.12 |
| 2009/0257502 A1* | 10/2009 | Ye et al. | 375/240.16 |
| 2009/0268809 A1* | 10/2009 | Cordara et al. | 375/240.12 |
| 2010/0002770 A1* | 1/2010 | Motta et al. | 375/240.16 |
| 2010/0086049 A1 | 4/2010 | Ye et al. | |
| 2010/0208827 A1* | 8/2010 | Divorra Escoda et al. | 375/240.24 |

FOREIGN PATENT DOCUMENTS

| | | |
|---|---|---|
| JP | 2011501566 A | 1/2011 |
| WO | WO2005022919 A1 | 3/2005 |
| WO | 2009051719 A2 | 4/2009 |

OTHER PUBLICATIONS

Sullivan, et al, "Video Compression—From Concepts to the H.264/AVC Standard," Proc. of IEEE, vol. 93, No. 1, Jan. 2005, pp. 18-31.*

Wiegand et al, "Overview of the H.264/AVC Video Coding Standard," IEEE Trans. on Circuits and Systems for Video Technology, vol. 13, No. 7, Jul. 2003, pp. 560-576.*

Schwarz et al, "Overview of the Scalable Video Coding Extension of the H.264/AVC Standard," IEEE Trans. on Circuits and Systems for Video Technology, vol. 17, No. 9, Sep. 2007, pp. 1103-1120.*

Adachi, "Core Exp. Results Improved MB Pred Modes", ITU Study Group 16—Video Coding Experts Group—ISO/IEC MPEG & ITU-T VCEG(ISO/IEC JTC1/SC29/WG11 and ITU-T SG16 Q6), XX, XX, No. JVT-B090, Feb. 1, 2002, XP030005089.

Flierl et al., "Generalized B Pictures and the Draft H.264/AVC Video-Compresiion Standard", IEEE Trans. Circuit and Systems for Video Technology, vol. 13, No. 7, pp. 587-597, 2003.

Gary Sullivan et al., "Detailed Algorithm Technical Description for ITU-T VCEG Draft H.26L Algorithm in Response to Video and Dcinema CfPs", ITU Study Group 16—Video Coding Experts Group—ISO/IEC MPEG & ITU-T VCEG(ISO/IEC JTC1/SC29/WG11 and ITU-T SG16 Q6), XX, XX, No. M7512, Jul. 10, 2001, XP030036619.

International Search Report and Written Opinion—PCT/US2011/025506, ISA/EPO—Apr. 28, 2011.

Jeon, "New syntax for Bi-directional mode in MH pictures", ITU Study Group 16—Video Coding Experts Group—ISO/IEC MPEG & ITU-T VCEG(ISO/IEC JTC1/SC29/WG11 and ITU-T SG16 Q6), XX, XX, No. JVT-C121, May 10, 2002, XP030005233.

JVT: "Draft ITU-T Recommendation and Final Draft International Standard of Joint Video Specification (ITU-T Rec. H .264 ISO/IEC 14496-10 AVC)", 7. JVT Meeting; 64. MPEG Meeting; Jul. 3, 2003-Mar. 14, 2003; Pattaya,TH; (Joint Video Team of ISO/IEC JTC1/SC29/WG11 and ITU-T 56.16 ),, No. JVT-G050r1, Mar. 14, 2003, XP030005712, ISSN: 0000-0427.

* cited by examiner

BLOCK TYPE SIGNALLING IN VIDEO CODING

This application claims the benefit of U.S. Provisional Application No. 61/306,261, filed 19 Feb. 2010, which is hereby incorporated by reference in its entirety.

TECHNICAL FIELD

The disclosure relates to video encoding and, more particularly, video encoding techniques that use bi-directional prediction.

BACKGROUND

Digital multimedia capabilities can be incorporated into a wide range of devices, including digital televisions, digital direct broadcast systems, wireless communication devices, wireless broadcast systems, personal digital assistants (PDAs), laptop or desktop computers, tablet computers, digital cameras, digital recording devices, video gaming devices, video game consoles, cellular or satellite radio telephones, digital media players, and the like. Digital multimedia devices may implement video coding techniques, such as MPEG-2, ITU-H.263, MPEG-4, or ITU-H.264/MPEG-4 Part 10, Advanced Video Coding (AVC), to transmit and receive or store and retrieve digital video data more efficiently. Video encoding techniques may perform video compression via spatial and temporal prediction to reduce or remove redundancy inherent in video sequences. New video standards such as high efficiency video coding (HEVC) standard, which is being developed by a Joint Collaborative Team on Video Coding (JCT-VC) established by the ISO/IEC Moving Picture Experts Group (MPEG) and ITU-T Video Coding Experts Group (VCEG), continue to emerge and evolve.

In video encoding, the compression often includes spatial prediction, motion estimation, and motion compensation. Intra-coding relies on spatial prediction and transform coding, such as discrete cosine transform (DCT), to reduce or remove spatial redundancy between video blocks within a given video frame. Inter-coding relies on temporal prediction and transform coding to reduce or remove temporal redundancy between video blocks of successive video frames of a video sequence. Intra-coded frames ("I-frames") are often used as random access points as well as references for the inter-coding of other frames. I-frames, however, typically exhibit less compression than other frames.

For inter-coding, a video encoder performs motion estimation to track the movement of matching video blocks between two or more adjacent frames or other units of video information that include encoded video blocks, such as slices of frames. Inter-coded frames may include predictive frames ("P-frames"), which may include video blocks predicted from a previous frame, and bi-directional predictive frames ("B-frames"), which may include video blocks predicted from a previous frame and a subsequent frame of a video sequence. The terms P-frames and B-frames are somewhat historic in the sense that early coding techniques limited prediction in specific directions. Newer coding formats and standards may not limit the prediction direction of P-frames or B-frames. Thus, the term "bi-directional" now refers to prediction based on two or more lists of reference data regardless of the temporal relationship of such reference data relative to the data being coded.

Consistent with newer video standards such as ITU H.264, for example, bi-directional prediction may be based on two different lists which do not necessarily need to have data that resides temporally before and after the current video block. In other words, B-video blocks may be predicted from two lists of data, which may correspond to data from two previous frames, two subsequent frames, or one previous frame and one subsequent frame. In contrast, P-video blocks are predicted based on one list, i.e., one data structure, which may correspond to one predictive frame, e.g., one previous frame or one subsequent frame.

For P- and B-video blocks, motion estimation generates motion vectors, which indicate the displacement of the video blocks relative to corresponding prediction video blocks in predictive reference frame(s) or other reference unit(s). Motion compensation uses the motion vectors to generate prediction video blocks from the predictive reference frame(s) or reference unit(s). After motion compensation, a residual video block is formed by subtracting the prediction video block from the original video block to be coded. The video encoder usually applies transform, quantization and entropy coding processes to further reduce the bit rate associated with communication of the residual block. I- and P-units are commonly used to define reference blocks for the inter-coding of P- and B-units.

SUMMARY

This disclosure describes video encoding and decoding techniques applicable to bi-directional prediction. In bi-directional prediction, a video block is predicatively encoded and decoded based on two different lists of predictive reference data. In one aspect of this disclosure, techniques are described for signaling from an encoder to a decoder a block type for a video block, where signaling of the block type includes separately signaling a partition size for the video block, a first prediction direction for the video block, and in some instances a second prediction direction for the video block. Techniques of the present disclosure may use separate syntax elements for signaling the partition size, the first prediction direction, and the second prediction direction. Additionally, techniques are described for signaling a sub-block type from an encoder to a decoder, where signaling the sub-block type can also include separately signaling a partition size and a prediction direction using separate syntax elements. The separate syntax elements can be individually encoded and transmitted from the encoder to the decoder.

In one example, this disclosure describes a method of encoding a bi-directional video block (B-video block). The method comprises generating first prediction data for the B-video block; generating second prediction data for the B-video block; selecting one of the first prediction data and second prediction data based on one or more rate-distortion metrics; based on the selected prediction data, generating a first syntax element indicative of a partition size for the B-video block; based on the selected prediction data, generating a second syntax element separate from the first syntax element and indicative of a prediction direction for a partition of the B-video block; and, outputting the first and second syntax elements.

In another example, this disclosure describes a video encoder for encoding a bi-directional video block (B-video block). The video encoder comprises one or more prediction units configured to generate first prediction data for the B-video block and second prediction data for the B-video block; a rate-distortion analysis unit configured to select one of the first prediction data and second prediction data to be included in the bitstream; and, one or more prediction units configured to generate a first syntax element indicative of a partition size for the B-video block based on the selected prediction data, and to generate a first syntax element indicative of a prediction direction for the B-video block based on the selected prediction data.

In another example, this disclosure describes a computer-readable storage medium comprising instructions that upon execution in a processor cause the processor to perform encoding of a bi-directional video block (B-video block). The encoding comprises: generating first prediction data for the B-video block; generating second prediction data for the B-video block; selecting one of the first prediction data and second prediction data based on one or more rate-distortion metrics; generating a first syntax element indicative of a partition size for the B-video block based on the selected prediction data; generating a second syntax element separate from the first syntax element and indicative of a prediction direction for a partition of the B-video block based on the selected prediction data; and outputting the first and second syntax elements.

In another example, this disclosure describes a device for encoding a bi-directional video block (B-video block). The device comprises means for generating first prediction data for the B-video block; means for generating second prediction data for the B-video block; means for selecting one of the first prediction data and second prediction data based on one or more rate-distortion metrics; means for generating a first syntax element indicative of a partition size for the B-video block based on the selected prediction data; and, means for generating a second syntax element separate from the first syntax element and indicative of a prediction direction for a partition of the B-video block based on the selected prediction data; and means for outputting the first and second syntax elements.

In another example, this disclosure describes a method of decoding a bi-directional video block (B-video block). The method comprises receiving encoded video data; receiving, in the encoded video data, a first syntax element indicative of a partition size used to encode the B-video block and a second syntax element indicative of a prediction direction used to encode the B-video block, wherein the first syntax element is separate from the second syntax element; and, decoding the B-video block based at least in part on the received first syntax element and the and the second syntax element.

In another example, this disclosure describes a video decoder for decoding a bi-directional video block (B-video block). The video decoder comprises a prediction unit configured to receive encoded video data, the encode video data comprising a first syntax element indicative of a partition size used to encode the B-video block and a second syntax element indicative of a prediction direction used to encode the B-video block, wherein the first syntax element is separate from the second syntax element; a motion compensation unit configured to decode the B-video block based on the received first syntax element and the and the second syntax element.

In another example, this disclosure describes a computer-readable storage medium comprising instructions that upon execution in a processor cause the processor to perform decoding of a bi-directional video block (B-video block). The decoding comprises receiving encoded video data; receiving, in the encoded video data, a first syntax element indicative of a partition size used to encode the B-video block and a second syntax element indicative of a prediction direction used to encode the B-video block, wherein the first syntax element is separate from the second syntax element; and, decoding the B-video block based at least in part on the received first syntax element and the and the second syntax element.

In another example, this disclosure describes a device for decoding a bi-directional video block (B-video block). The device comprises means for receiving encoded video data; means for receiving a first syntax element indicative of a partition size used to encode the B-video block and a second syntax element indicative of a prediction direction used to encode the B-video block, wherein the first syntax element is separate from the second syntax element; and, means for decoding the B-video block based at least in part on the received first syntax element and the and the second syntax element.

The techniques described in this disclosure may be implemented in hardware, software, firmware, or combinations thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a tangible computer-readable storage medium and loaded and executed in the processor.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
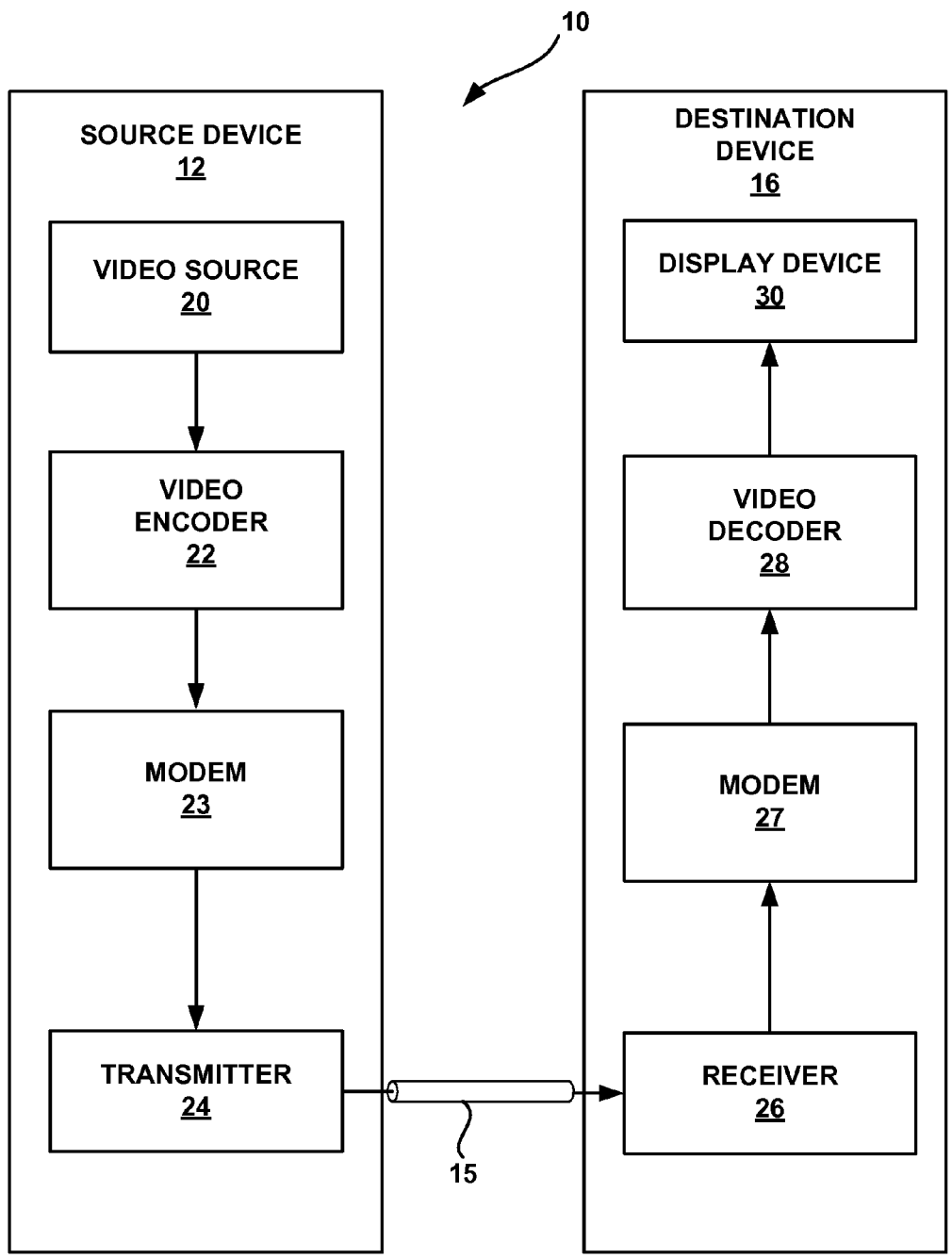
FIG. 1 is a block diagram illustrating an example video encoding and decoding system that may implement techniques of this disclosure.

This disclosure describes video encoding and decoding techniques applicable to bi-directional prediction. In bi-directional prediction, a video block is predicatively encoded and decoded based on two different lists of predictive reference data. In one aspect of this disclosure, techniques are described for signaling from an encoder to a decoder a block type for a video block, where signaling of the block type includes separately signaling a partition size for the video block, a first prediction direction for the video block, and in some instances a second prediction direction for the video block. Techniques of the present disclosure may use separate syntax elements for signaling the partition size, the first prediction direction, and the second prediction direction. Additionally, techniques are described for signaling from an encoder to a decoder a sub-block type, where signaling the sub-block type can also include separately signaling a partition size and a prediction direction using separate syntax elements. The separate syntax elements can be individually encoded and transmitted from the encoder to the decoder.

Separate syntax elements, as used in this disclosure, generally refers to a plurality of syntax elements to signal, from an encoder to a decoder, a plurality of pieces of information, such as partition sizes and prediction directions. In contrast, a joint syntax element refers to a single syntax element that is used to signal a plurality of pieces of information from an encoder to a decoder. For example, in contrast to existing coding schemes where a joint syntax element might be used to signal both a partition size and a prediction direction, techniques of this disclosure include using a first syntax element to signal the partition size and a separate, second syntax element to signal the predication direction. In some instances, a joint syntax element might also be a separate syntax element relative to another syntax element. For example, a joint syntax element used for signaling a first prediction direction and a second prediction direction could be a separate syntax element relative to a syntax element being used to signal a partition size. As will be discussed in more detail below, separate syntax elements can be coded and processed independently of one another. For example, two separate syntax elements may undergo two different entropy coding processes prior to be transmitted.

A coding scheme that uses separate syntax elements for signaling partition size and prediction direction may be more easily extended for use with larger video block sizes compared to a coding scheme that uses joint syntax elements. For example, introducing a new video block size or new partition size into a coding scheme that utilizes joint syntax elements might require the introduction of more new syntax elements compared to a coding scheme that separately signals partition size and prediction direction, as described in this disclosure. Additionally, using separate syntax elements compared to a joint syntax element may result in coding efficiency gains due to improved entropy coding in some instances.

FIG. 1 is a block diagram illustrating one exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 comprise wireless communication devices, such as wireless handsets, so-called cellular or satellite radiotelephones, or any devices that can communicate video information over a communication channel 15, which may or may not be wireless. The techniques of this disclosure, however, which concern signaling block types and sub-block types for B-units from an encoder to a decoder, are not necessarily limited to wireless applications or settings.

In the example of FIG. 1, source device 12 may include a video source 20, video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to generate separate syntax elements to indicate a partition size, a first prediction direction, and a second direction for a video block, and additionally, to generate separate syntax elements to indicate a partition size and a prediction direction for a sub-block. The separate syntax elements can be individually encoded and transmitted from video encoder 22 to video decoder 28. Video decoder 28 may receive the separate syntax elements indicating the selection. Accordingly, video decoder 28 may perform the proper video decoding based on the received syntax elements.

The illustrated system 10 of FIG. 1 is merely one example. The signaling techniques of this disclosure may be performed by any coding device that supports bi-directional motion compensated prediction. Source device 12 and destination device 16 are merely examples of such coding devices in which source device 12 generates coded video data for transmission to destination device 16. In some cases, devices 12, 16 may operate in a substantially symmetrical manner such that, each of devices 12, 16 includes video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA), orthogonal frequency division multiplexing (OFDM) or another communication technique or standard, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over channel 15, and modem 27 demodulates the information. The information communicated over channel 15 may include information defined by video encoder 22, which may be used by video decoder 28 consistent with this disclosure. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Accordingly, modem 23 and transmitter 24 may support many possible wireless protocols, wired protocols or wired and wireless protocols. Communication channel 15 may form part of a packet-based network, such as a local area network (LAN), a wide-area network (WAN), or a global network, such as the Internet, comprising an interconnection of one or more networks. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16.

Video encoder 22 and video decoder 28 may operate according to a video compression standard, such as the newly emerging ITU-T H.265 standard. The techniques of this disclosure, however, are not limited to any particular coding standard. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence typically includes a series of video frames. Video encoder 20 operates on video blocks within individual video frames in order to encode the video data. In one example, a video block may correspond to a macroblock or a partition of a macroblock. Macroblocks are one type of video block defined by the ITU H.264 standard and other standards. Macroblocks typically refer to 16×16 blocks of data, although the term is also commonly used to generically refer to any video block of N×N size. The ITU-T H.264 standard supports intra prediction in various block sizes, such as 16×16, 8×8, or 4×4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" refers to the pixel dimensions of the block in terms of vertical and horizontal dimensions, e.g., 16×16 pixels. In general, a 16×16 block will have 16 pixels in a vertical direction and 16 pixels in a horizontal direction. Likewise, an N×N block generally has N pixels in a vertical direction and N pixels in a horizontal direction, where N represents a positive integer value. The pixels in a block may be arranged in rows and columns.

The emerging ITU H.265 standard defines new terms for video blocks. In particular, with ITU H.265, video blocks (or partitions thereof) may be referred to as "coded units." With the ITU-T H.265 standard, largest coded units (LCUs) may be divided into smaller and smaller coded units (CUs) according to a quadtree partitioning scheme, and the different CUs that are defined in the scheme may be further partitioned into so-called prediction units (PUs). The LCUs, CUs, and PUs are all video blocks within the meaning of this disclosure. Other types of video blocks may also be used, consistent with the ITU H.265 standard or other video coding standards. Thus, the phrase "video blocks" refers to any size of video block.

Video blocks may have fixed or varying sizes, and may differ in size according to a specified coding standard. Each video frame may include a plurality of slices. Each slice may include a plurality of video blocks, which may be arranged into partitions, also referred to as sub-blocks. In accordance with the quadtree partitioning scheme referenced above, an N/2×N/2 first CU might be a sub-block of an N×N LCU, an N/4×N/4 second CU may also be a sub-block of the first CU. An N/8×N/8 PU might be a sub-block of the second CU. Similarly, as a further example, block sizes that are less than 16×16 may be referred to as partitions of a 16×16 video block or as sub-blocks of the 16×16 video block. Likewise, for an N×N block, block sizes less than N×N may be referred to as partitions or sub-blocks of the N×N block. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. Larger video blocks can provide greater coding efficiency, and may be used for locations of a video frame that include a low level of detail. A slice may be considered to be a plurality of video blocks and/or sub-blocks. Each slice may be an independently decodable series of video blocks of a video frame. Alternatively, frames themselves may be decodable series of video blocks, or other portions of a frame may be defined as decodable series of video blocks. The term "series of video blocks" may refer to any independently decodable portion of a video frame such as an entire frame, a slice of a frame, a group of pictures (GOP) also referred to as a sequence, or another independently decodable unit defined according to applicable coding techniques.

Following inter-based predictive encoding, and following any transforms (such as a 4×4 or 8×8 integer transform or a discrete cosine transform or DCT), quantization may be performed. Quantization generally refers to a process in which coefficients are quantized to possibly reduce the amount of data used to represent the coefficients. The quantization process may reduce the bit depth associated with some or all of the coefficients. Following quantization, entropy coding may be performed, e.g., according to content adaptive variable length coding (CAVLC), context adaptive binary arithmetic coding (CABAC), or another entropy coding methodology.

The techniques of this disclosure are specifically applicable to B-video blocks which make use of bi-directional prediction, which might include both weighted bi-directional prediction and non-weighted bi-directional prediction. In this disclosure, the term "B-units" will be used to refer generally to any types of B-units, which may include B-frames, B-slices, or possibly other video units that include at least some B-video blocks.

As mentioned above, bi-directional prediction is prediction of so-called "B-video blocks" based on two different lists of data. B-video blocks use two lists of previously-coded reference pictures, list 0 and list 1. These two lists can each contain past and/or future coded pictures in temporal order. B-video blocks may be predicted in one of several ways: motion-compensated prediction from a list 0 reference picture, motion-compensated prediction from a list 1 reference picture, or motion-compensated prediction from the combination of both list 0 and list 1 reference pictures. To get the combination of both list 0 and list 1 reference pictures, two motion compensated reference areas are obtained from list 0 and list 1 reference picture respectively.

B-video blocks may be predicted from two lists of data from two previous frames, two lists of data from subsequent frames, or one list of data from a previous frame and one from a subsequent frame. Even though list 0 and list 1 do not necessarily correlate with a particular temporal direction, the selection of whether to perform motion-compensated by list 0, list 1, or both list 0 and list 1 is commonly referred to as a prediction direction. In contrast to B-video blocks, P-video blocks are predicted based on one list, which may correspond to one predictive frame, e.g., one previous frame or one subsequent frame. B-frames and P-frames may be more generally referred to as P-units and B-units. P-units and B-units may also be realized in smaller units, such as slices of frames or portions of frames. B-units may include B-video blocks, P-video blocks or I-video blocks. P-units may include P-video blocks or I-video blocks. I-units may include only I-video blocks.

B-video blocks utilizing bi-directional prediction (i.e. both list 0 and list 1) may be coded using either weighted bi-directional prediction or non-weighted bi-directional prediction. Weighted bi-directional prediction refers to bi-directional prediction that allows for weight factors to be assigned to the two different lists. Each list may comprise a set of data associated with a predictive frame or other series of video blocks. In weighted bi-directional prediction one list may be weighted more heavily in generating predictive data. If one of the lists has data that is more similar to the video block being coded, for example, then that list may be weighted more heavily than the other list.

For different types of weighted bi-directional prediction in accordance with ITU-T H.264 for example, video encoder 22 and video decoder 28 may generally support three different types of prediction modes. A first prediction mode, referred to as "default weighted prediction," refers to weighted prediction in which the weight factors associated with two or more different lists are pre-defined by some default setting. Default weighted prediction, in some cases, may assign equal weightings to each of the lists, although unequal weighting could also be pre-defined for a default weighted prediction mode.

A second prediction mode, referred to as "implicit weighted prediction," refers to weighted prediction in which the weight factors associated with two or more different lists are defined based on some implicit factors associated with the data. For example, implicit weight factors may be defined by the relative temporal positions of the data in the two different lists relative to the data being predictively coded. In both default weighted prediction and implicit weighted prediction, the weight factors are not included in the bitstream. Instead, video decoder 28 may be programmed to know the weight factors (for default) or may be programmed to know how to derive the weight factors (for implicit).

A third prediction mode, referred to as "explicit weighted prediction," refers to weighted prediction in which the weight factors are dynamically defined as part of the coding process, and encoded into the bitstream. Explicit weighted prediction is different than default weighted prediction and implicit weighted prediction in this respect, e.g., explicit weighted prediction results in weight factors that are encoded as part of the bitstream.

These three weighted bi-directional prediction modes are merely presented to provide context for the signaling techniques described in this disclosure. It is contemplated, however, that the techniques of this disclosure may also be implemented in conjunction with non-weighted bi-directional prediction or modes of weighted bi-directional prediction other than those described. For example, it is contemplated that the techniques of this disclosure can be implemented using all the various bi-directional prediction modes included in the H.265 standard.

Video encoder 22 may select a video block size and a partition size that yields favorable rate-distortion metrics. In accordance with an aspect of this disclosure, video encoder 22 may determine a prediction direction for a partition of the video block. If bi-directional prediction is chosen, video encoder 22 may further determine one of the above weighted bi-directional prediction modes for the partition of the video block. To select video block sizes yielding favorable rate-distortion metrics, rate-distortion metrics may be analyzed for both large video blocks (e.g., 32×32, 64×64, or larger) and small video blocks (e.g., 16×16 or smaller) with different partitioning schemes (i.e. different partition sizes). As will be illustrated more below, a N×N video block may be partitioned into a single N×N partition, two N/2×N partitions, two N×N/2 partitions, or four N/2×N/2 partitions. In some instances, a partition may be further partitioned.

An encoder may compare rate-distortion metrics between video blocks of different sizes and partitioning schemes, such as 16×16 video blocks with multiple partitioning schemes, 32×32 video blocks with multiple partitioning schemes, and 64×64 video blocks with multiple partitioning schemes, for a coded series of video blocks, such as a frame or a slice. The encoder may then select the video block size and partitioning scheme that results in the best rate-distortion and encode the video block using the selected video block size, i.e., the video block size with the best rate-distortion.

The selection may be based on encoding the frame or slice in three or more passes, e.g., a first pass using 16×16 pixel video blocks, a second pass using 32×32 pixel video blocks, and a third pass using 64×64 pixel video blocks, and comparing rate-distortion metrics for each pass. In this manner, an encoder may improve rate-distortion by varying the video block size and partitioning scheme and selecting the video block size and partitioning scheme that results in the best or optimal rate-distortion for a given series of video blocks, such as a slice or frame. The encoder may further transmit syntax information for the series of video blocks, e.g., as part of a frame header or a slice header, that identifies the size of the video blocks used in the series of video blocks. In a block header, the encoder may further transmit separate syntax elements that identify the partitioning scheme used and the prediction direction for each partition of the block. If a block is partitioned into 4 sub-block, the encoder may transmit in a sub-block header separate syntax elements that identify the partitioning scheme for the sub-block and a prediction direction.

Extending these concepts to the terminology emerging for H.265, the selection may be based on encoding the frame or slice in three or more passes, e.g., a first pass using 16×16 LCUs, a second pass using 32×32 LCUs, and a third pass using 64×64 LCUs, and comparing rate-distortion metrics for each pass. In this manner, an encoder may improve rate-distortion by varying the LCU size and partitioning scheme and selecting the LCU size and partitioning scheme that results in the best or optimal rate-distortion for a given series of video blocks, such as a slice or frame. The encoder may further transmit syntax information for the series of video blocks, e.g., as part of a frame header or a slice header, that identifies the LCU size used in the series of video blocks. In a LCU header, the encoder may further transmit separate syntax elements that identify the partitioning scheme used for the LCU and the prediction direction for each partition of the LCU. If an LCU is partitioned into 4 CUs, the encoder may transmit in a CU header separate syntax elements that identify the partitioning scheme for the CU and a prediction direction.

For some video frames or slices, large video blocks may present substantial bit rate savings and thereby produce the best rate-distortion results, given relatively low distortion. For other video frames or slices, however, smaller video blocks may present less distortion, outweighing bit rate in the rate-distortion cost analysis. Hence, in different cases, 64×64, 32×32 or 16×16 may be appropriate for different video frames or slices, e.g., depending on video content and complexity. Similarly, different partitioning schemes may also be appropriate for different video blocks depending on video content and complexity.

Two or more separate syntax elements may be generated and encoded into the bitstream in order to identify a partition size for the video block and one or more prediction directions for the partitions. Device 12 transmits the two or more separate syntax elements to decoder 28. Decoder 28 may decode and interpret the syntax element(s), and based on the syntax element(s), decoder 28 may reconstruct the video block.

Figure 2:
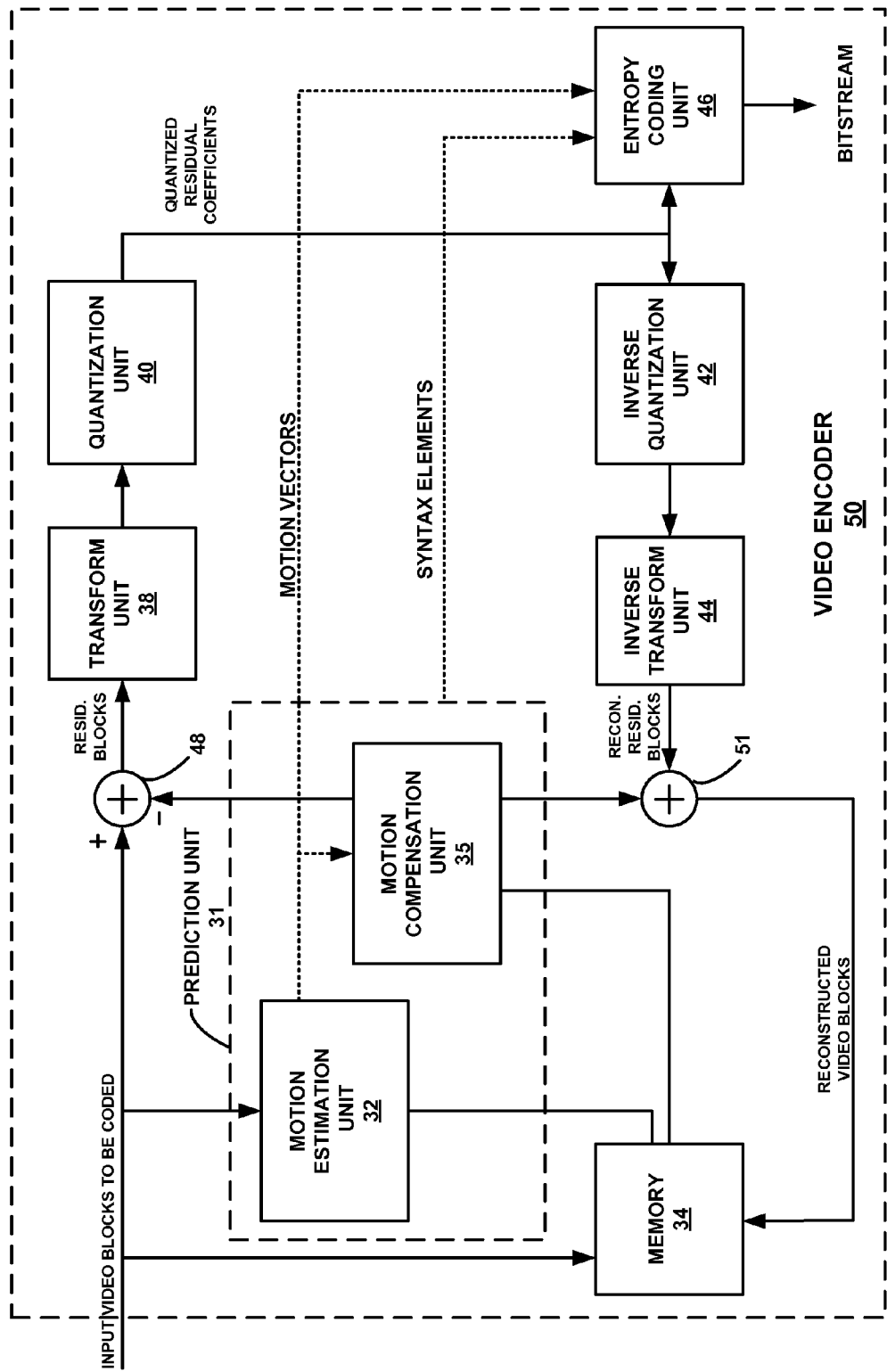
FIG. 2 is a block diagram illustrating an example of a video encoder that may perform techniques consistent with this disclosure.

FIG. 2 is a block diagram illustrating an example of a video encoder 50 that may perform techniques consistent with this disclosure. Video encoder 50 may correspond to video encoder 22 of source device 12, or a video encoder of a different device. Video encoder 50 may perform intra- and inter-coding of blocks within video frames, although intra-coding components are not shown in FIG. 2 for ease of illustration. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial based compression mode and Inter-modes such as prediction (P-mode) or bi-directional (B-mode) may refer to the temporal based compression modes.

As shown in FIG. 2, video encoder 50 receives a current video block within a video frame or slice to be encoded. In the example of FIG. 2, video encoder 50 includes prediction unit 31, which includes motion estimation unit 32 and motion compensation unit 35, a memory 34, an adder 48, a transform unit 38, a quantization unit 40, and an entropy coding unit 46. For video block reconstruction, video encoder 50 also includes an inverse quantization unit 42, an inverse transform unit 44, and an adder 51. Video encoder 50 may also include a deblocking filter (not shown) to filter block boundaries to remove blockiness artifacts from reconstructed video. If desired, the deblocking filter would typically filter the output of adder 51.

During the encoding process, video encoder 50 receives a video block to be coded, and motion estimation unit 32 and motion compensation unit 35 perform inter-predictive coding. Motion estimation unit 32 and motion compensation unit 35 may be highly integrated within prediction unit 31, but are shown separately for illustrative purposes. Motion estimation is typically considered the process of generating motion vectors, which estimate motion for video blocks. A motion vector, for example, may indicate the displacement of a predictive block within a predictive frame (or other series of video blocks) relative to the current block being coded within the current frame (or other series of video blocks). Motion compensation is typically considered the process of fetching or generating the predictive block based on the motion vector determined by motion estimation. Again, motion estimation unit 32 and motion compensation unit 35 may be functionally integrated. For demonstrative purposes, the techniques described in this disclosure are described as being performed by motion compensation unit 35, but more generally, could be performed by any portion of prediction unit 31.

Motion estimation unit 32 selects the appropriate motion vector for the video block to be coded by comparing the video block to video blocks of one or more predictive series of video blocks (e.g., a previous and/or future frame in terms of time or temporally). Motion estimation unit 32 may, as an example, select a motion vector for a B-frame in a number of ways. In one way, motion estimation unit 32 may select a previous or future frame from a first set of frames (referred to as list 0) and determine a motion vector using only this previous or future frame from list 0. Alternatively, motion estimation unit 32 may select a previous or future frame from a second set of frames (referred to as list 1) and determine a motion vector using only this previous or future frame from list 1. In yet another example, motion estimation unit 32 may select a first frame from list 0 and a second frame from list 1 and select one or more motion vectors from the first frame of list 0 and the second frame of list 1. This third form of prediction may be referred to as bi-predictive motion estimation. The selected motion vector for any given list may point to a predictive video block that is most similar to the video block being coded, e.g., as defined by a metric such as sum of absolute difference (SAD) or sum of squared difference (SSD) of pixel values of the predictive block relative to pixel values of the block being coded.

In one example, if motion estimation unit 32 selects bi-directional motion estimation for a video block, three motion-compensated bi-predictive algorithms or modes may be used to predict a B-frame or portions thereof, such as video blocks, macroblocks, LCUs, CUs, and PUs or any other discreet and/or contiguous portion of a B-frame. A first motion-compensated bi-predictive algorithm or mode, which is commonly referred to as default weighted prediction, may involve applying default weights to each identified video block of the first frame of list 0 and the second frame of list 1. The default weights may be programmed according to the standard, and are often selected to be equal for default weighted prediction. The weighted blocks of the first and second frames are then added together and divided by the total number of frames used to predict the B-frame, e.g., two in this instance.

B-units use two lists of previously-coded reference pictures, list 0 and list 1. These two lists can each contain past and/or future coded pictures in temporal order. Blocks in a B-unit may be predicted in one of several ways: motion-compensated prediction from a list 0 reference picture, motion-compensated prediction from a list 1 reference picture, or motion-compensated prediction from the combination of both list 0 and list 1 reference pictures. To get the combination of both list 0 and list 1 reference pictures, two motion compensated reference areas are obtained from list 0 and list 1 reference picture respectively. Their combination will be used to predict the current block.

As mentioned, B-units may allow three types of weighted prediction. For simplicity, only forward prediction in unidirectional prediction is shown below, although backwards prediction could also be used. Default weighted prediction may be defined by the following equations for unidirectional prediction and bidirectional prediction, respectively.

$$\text{Unidirectional prediction: } pred(i,j)=pred0(i,j)$$

$$\text{Bidirectional prediction: } pred(i,j)=(pred0(i,j)+pred1(i,j)+1)\gg 1$$

where pred0(i,j) and pred1(i,j) are prediction data from list 0 and list 1.

Implicit weighted prediction may be defined by the following equations for unidirectional prediction and bidirectional prediction, respectively.

$$\text{Unidirectional prediction: } pred(i,j)=pred0(i,j)$$

$$\text{Bidirectional prediction: } pred(i,j)=(pred0(i,j)*w0+pred1(i,j)*w1+32)\gg 6$$

In this case, each prediction is scaled by a weighting factor w0 or w1, where w0 and w1 are calculated based on the relative temporal position of the list 0 and list 1 reference pictures.

Explicit weighted prediction may be defined by the following equations for unidirectional prediction and bidirectional prediction, respectively.

$$\text{Unidirectional prediction: } pred(i,j)=(pred0(i,j)*w0+2^{r-1})\gg r+o1$$

$$\text{Bidirectional prediction: } pred(i,j)=(pred0(i,j)*w0+pred1(i,j)*w1+2^r)\gg(r+1)+((o1+o2+1)\gg 1)$$

In this case, the weighting factors are determined by the encoder and transmitted in the slice header, and o1 and o2 are picture offsets for list 0 and list 1 reference pictures respectively.

Table 1 below shows 23 different block types (labeled 0-22) for coding a 16×16 video block of a B-unit, although the same concept can be extended to an N×N video block. The column labeled "Block Type" shows a shorthand notation separate from the Block Type Number for identifying the block type. The column labeled "partition size" identifies how the video block is partitioned (D-16×16, 16×16, 8×16, 16×8, or 8×8). For block types that use direct mode (D-16×16), no motion vector, and hence no prediction direction, is signaled from encoder to decoder because the motion vector is determined at the decoder based on neighboring video blocks. For block types that include one partition (i.e. partition sizes of 16×16), the column labeled "Prediction Dir0" identifies the prediction direction for the one partition. For block types that include two partitions (i.e. partition sizes of 8×16 and 16×8), the column labeled "Prediction Dir0" identifies a prediction direction for the first partition, and the column labeled "Prediction Dir1" identifies a prediction direction for the second partition. As discussed above, the prediction directions include using just list 0 (L0), just list 1 (L0), and bi-predictive motion estimation (Bi) using both list 0 and list 1.

TABLE 1

| Block Type # | Block Type | Partition size | Prediction Dir0 | Prediction Dir1 |
|---|---|---|---|---|
| 0 | B_Direct_16 × 16 | D—16 × 16 | — | — |
| 1 | B_L0_16 × 16 | 16 × 16 | L0 | — |
| 2 | B_L1_16 × 16 | 16 × 16 | L1 | — |
| 3 | B_Bi_16 × 16 | 16 × 16 | Bi | — |
| 4 | B_L0_L0_16 × 8 | 16 × 8 | L0 | L0 |
| 5 | B_L0_L0_8 × 16 | 8 × 16 | L0 | L0 |
| 6 | B_L1_L1_16 × 8 | 16 × 8 | L1 | L1 |
| 7 | B_L1_L1_8 × 16 | 8 × 16 | L1 | L1 |
| 8 | B_L0_L1_16 × 8 | 16 × 8 | L0 | L1 |
| 9 | B_L0_L1_8 × 16 | 8 × 16 | L0 | L1 |
| 10 | B_L1_L0_16 × 8 | 16 × 8 | L1 | L0 |
| 11 | B_L1_L0_8 × 16 | 8 × 16 | L1 | L0 |
| 12 | B_L0_Bi_16 × 8 | 16 × 8 | L0 | Bi |
| 13 | B_L0_Bi_8 × 16 | 8 × 16 | L0 | Bi |
| 14 | B_L1_Bi_16 × 8 | 16 × 8 | L1 | Bi |
| 15 | B_L1_Bi_8 × 16 | 8 × 16 | L1 | Bi |
| 16 | B_Bi_L0_16 × 8 | 16 × 8 | Bi | L0 |
| 17 | B_Bi_L0_8 × 16 | 8 × 16 | Bi | L0 |
| 18 | B_Bi_L1_16 × 8 | 16 × 8 | Bi | L1 |
| 19 | B_Bi_L1_8 × 16 | 8 × 16 | Bi | L1 |
| 20 | B_Bi_Bi_16 × 8 | 16 × 8 | Bi | Bi |
| 21 | B_Bi_Bi_8 × 16 | 8 × 16 | Bi | Bi |
| 22 | B_8 × 8 | 8 × 8 | — | — |

Instead of each of the 23 block types above having a single unique syntax element (i.e. 23 different syntax elements), techniques of the present disclosure include using separate syntax elements for each of partition size, prediction direction 0, and prediction direction 1. Accordingly, the 23 block types above can be represented as a combination of 5 partition sizes (D-16×16, 16×16, 8×16, 16×8, and 8×8) and 3 prediction directions (L0, L1, and Bi). Thus using option 12 as an example, for a video block with 16×8 partitioning where the first partition is predicted using list 0 and the second partition is predicted using both list 0 and list 1, three separate syntax elements could be generated. The first syntax element might identify 16×8 partitioning; the second syntax element might identify list 0 (L0), and the third syntax element might identify bi-directional prediction (Bi).

Block type 22 of Table 1 corresponds to the 16×16 video block being partitioned into 4 8×8 sub-blocks, in which case each sub-block might use its own partitioning scheme. Therefore, in response to receiving a syntax element indicating 8×8 partitioning for a 16×16 video block, a video encoder will know to look for additional syntax in a sub-block header to indicate a sub-block type. As with the block type examples above, the sub-block type can be signaled using two or more separate syntax elements. For an 8×8 sub-block, indicating a partition size and prediction direction for the partitions of the sub-block, a first syntax element can identify the partition size and a second syntax element can identify the prediction direction. Table 2 below shows an example of the sub-block types (labeled 0-13) that might be used for an 8×8 sub-block. The column labeled "Sub-Block Type#" gives a number for each sub-block type, while the column labeled "Sub-Block Type" gives a shorthand notation for the sub-block type. The column labeled "Partition Size" identifies a partitioning scheme for the sub-block, and the column labeled "Prediction Dir" identifies a prediction direction for the partitions of the sub-block.

TABLE 2

| Sub-Block Type # | Sub-Block Type | Partition size | Prediction Dir |
|---|---|---|---|
| 0 | B_Direct_8 × 8 | D—8 × 8 | — |
| 1 | B_L0_8 × 8 | 8 × 8 | L0 |
| 2 | B_L1_8 × 8 | 8 × 8 | L1 |
| 3 | B_Bi_8 × 8 | 8 × 8 | Bi |
| 4 | B_L0_8 × 4 | 8 × 4 | L0 |
| 5 | B_L0_4 × 8 | 4 × 8 | L0 |
| 6 | B_L1_8 × 4 | 8 × 4 | L1 |
| 7 | B_L1_4 × 8 | 4 × 8 | L1 |
| 8 | B_Bi_8 × 4 | 8 × 4 | Bi |
| 9 | B_Bi_4 × 8 | 4 × 8 | Bi |
| 10 | B_L0_4 × 4 | 4 × 4 | L0 |
| 11 | B_L1_4 × 4 | 4 × 4 | L1 |
| 12 | B_Bi_4 × 4 | 4 × 4 | Bi |

In some implementations, as in the example of Table 2, both 8×4 partitions of the sub-block may use the same prediction direction. For example, both partitions of sub-block type 4 of Table 2 have the same prediction direction (L0). In other implementations, however, different partitions of a sub-block may each have a unique prediction direction, similar to Table 1 but with smaller partitions.

A video block may have multiple levels of partitioning. For example, a slice or frame may contain a syntax element in the slice header or frame header indicating that the slice or frame has an LCU size of 64×64. Each LCU, signaled in an LCU header, may have separate syntax elements indicating a partition size and either one or two prediction directions for partitions of the LCU, or the LCU header may have a syntax element indicating the LCU is partitioned into 4 32×32 CUs. Each 32×32 CU, signaled in a CU header, may then have separate syntax elements indicating a partition size and either one or two prediction directions of the partitions, or may have a syntax element indicating the 32×32 CU is further partitioned into 4 16×16 CUs. Likewise, each 16×16 CU header may have separate syntax elements indicating a partition size and one or two prediction directions or a syntax element indicating further partitioning.

As with the block types discussed in Table 1, the sub-block types of Table 2 can be signaled using separate syntax elements. Instead of each of the 13 block types above having a single unique syntax element (i.e. 13 different syntax elements), techniques of the present disclosure include the use of separate syntax elements for each of partition size and prediction direction. Accordingly, the 13 block types above can be represented as a combination of 5 partition sizes (D-8×8, 8×8, 4×8, 8×4, and 4×4) and 3 prediction directions (L0, L1, and Bi). Thus using option 7 as an example, for a video sub-block with 4×8 partitioning where the partitions are to be predicted using list 1, two separate syntax elements could be generated. The first syntax element might identify 4×8 partitioning, and the second syntax element might identify list 1 (L1).

Once the desired prediction data is identified by motion compensation unit 35, as described herein, video encoder 50 forms a residual video block by subtracting the prediction data from the original video block being coded. Adder 48 represents the component or components that perform this subtraction operation. Transform unit 38 applies a transform, such as a discrete cosine transform (DCT) or a conceptually similar transform, to the residual block, producing a video block comprising residual transform block coefficients. Transform unit 38, for example, may perform other transforms, such as those defined by a coding standard, which are conceptually similar to DCT. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

Quantization unit 40 quantizes the residual transform coefficients to further reduce bit rate. Following quantization, entropy coding unit 46 entropy codes the quantized transform coefficients. Entropy coding unit 46 further entropy codes the syntax elements generated by motion compensation unit 35. For example, entropy coding unit 46 may perform content adaptive variable length coding (CAVLC), context adaptive binary arithmetic coding (CABAC), or another entropy coding methodology. As the syntax elements generated by motion compensation unit 35 are separate syntax elements, each syntax element may undergo a different entropy coding process. For example, entropy coding unit 46 may maintain statistics for applying CAVLC to syntax elements for partition sizes and separate statistics for applying CAVLC to syntax elements for prediction directions. Following the entropy coding by entropy coding unit 46, the encoded video may be transmitted to another device or archived for later transmission or retrieval. The coded bitstream may include entropy coded residual blocks, motion vectors for such blocks, and other syntax such as the syntax described herein.

Inverse quantization unit 42 and inverse transform unit 44 apply inverse quantization and inverse transformation, respectively, to reconstruct the residual block in the pixel domain, e.g., for later use as the reference block in the manner described above. Adder 51 adds the reconstructed residual block to the motion compensated prediction block produced by motion compensation unit 35 to produce a reconstructed video block for storage in memory 34. The reconstructed video block may be used by motion estimation unit 32 and motion compensation unit 35 as a reference block to inter-encode a block in a subsequent video frame.

Figure 3:
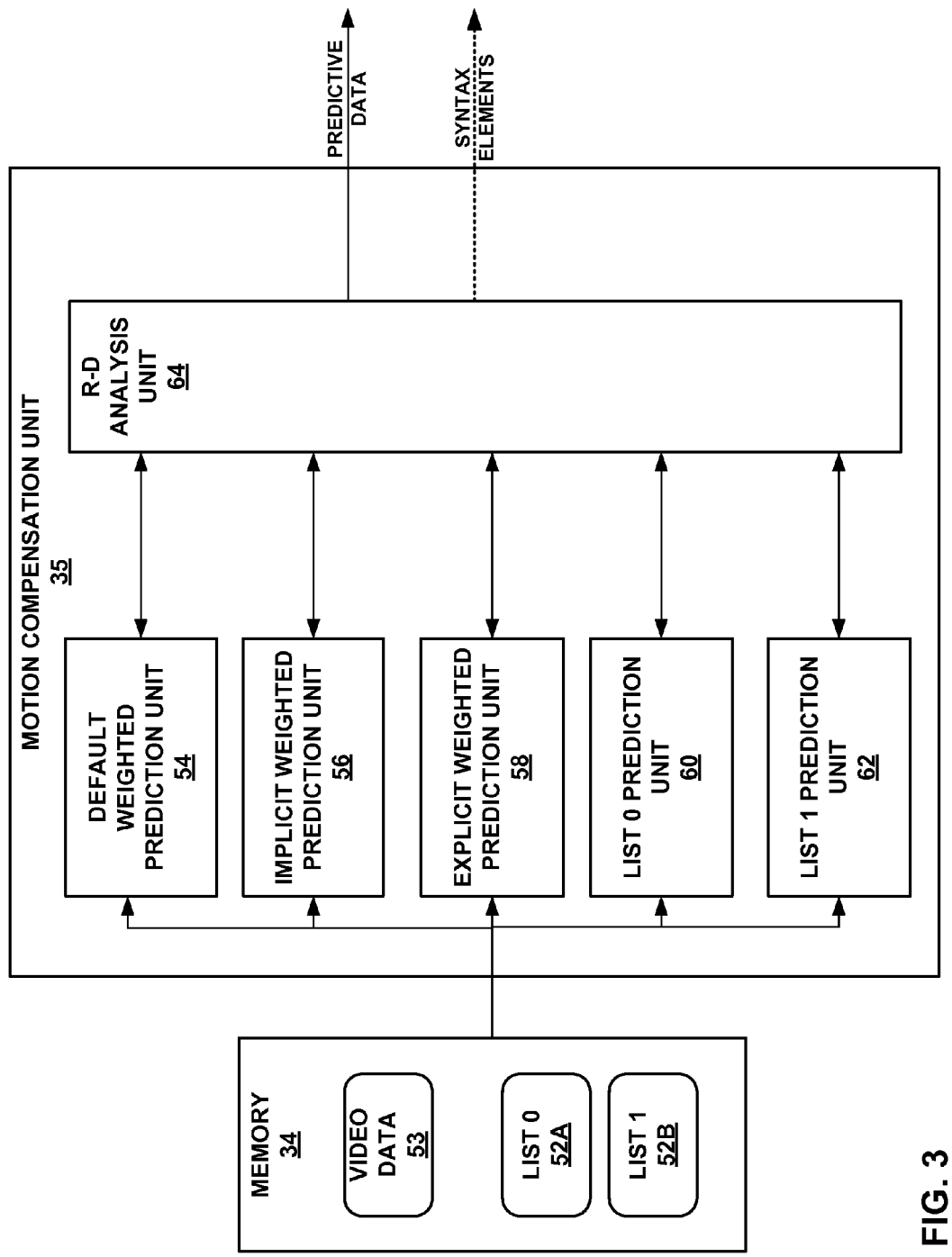
FIG. 3 is a block diagram illustrating an example of a motion compensation unit in more detail.

FIG. 3 is a block diagram illustrating an example of motion compensation unit 35 of FIG. 2 in more detail. As discussed above, motion compensation unit 35 might likely be highly integrated with motion estimation unit 32 within prediction unit 31. Therefore, it should be understood that division of functionality between motion estimation unit 32 and motion compensation unit 35 in this disclosure is for purposes of explanation only. As shown in the example of FIG. 3, motion compensation unit 35 couples to memory 34, which stores first and second sets of reference units or reference frames as list 0 52A and list 1 52B. In addition, memory 34 may store the current video data 53 coded. Memory 34 may comprise a shared memory structure, or possibly several different memories, storage units, buffers, or other types of storage that facilitates storage of any data discussed herein. List 0 52A and list 1 52B are data associated with two different predictive units, e.g., data from two different frames or slices or macroblocks, in accordance with bi-directional prediction. Again, bi-directional prediction is not necessarily limited to any prediction directions, and thus list 0 52A and list 1 52B may store data from two previous frames or slices, two subsequent frames or slices, or one previous frame or slice and one subsequent frame or slice. Furthermore, in some cases, list 0 52A and/or list 1 52B could each include data associated with multiple frames, slices, or video blocks. List 0 52A and/or list 1 52B are simply two different sets of possible predictive data, and each list may include one frame or slice, or several frames, slices, or video blocks in any direction relative to the current video block being encoded.

As shown in FIG. 3, motion compensation unit 35 includes a default weighted prediction unit 54, an implicit weighted prediction unit 56, and an explicit weighted prediction unit 58 for determining a type of bi-directional prediction to be used for coding a partition of a video block. Motion compensation unit 35 further includes a List 0 prediction unit 60 and a List 1 prediction unit 62 for determining whether forward prediction (list 0, for example) or backwards prediction (list 1, for example) should be used for coding a video block. As mentioned previously, bi-directional prediction may not be limited to specific temporal directions. Therefore, while the terms forward and backwards when discussing prediction are still commonly used to refer to two different lists, the two lists do not necessarily have any specific temporal direction. Units 54, 56 and 58 respectively may perform default weighted prediction, implicit weighted prediction, and explicit weighted prediction as described herein. Rate-distortion (R-D) analysis unit 64 may select one of the weighted prediction data among these possibilities or may select one of List 0 prediction data or List 1 prediction data, and may implement techniques of this disclosure to facilitate the selection process.

Motion compensation unit 35 may also includes a rounding unit that causes one or more of units 54, 56, 58, 60, and 62 to generate both rounded and unrounded versions of the respective weighted prediction data and an offset calculation unit, which calculates offset as a difference between an average of video block values of a block being coded and an average of video block values of the prediction block. For purposes of simplicity, the rounding unit and offset unit are not shown in FIG. 3.

R-D analysis unit 64 may analyze the different predictive data of units 54, 56, 58, 60, and 62, and may select the predictive data that generates the best results in terms of quality, or in terms of rate and distortion. Depending on various implementation preferences, R-D analysis unit can be configured to balance the competing interests of coding rate (i.e. number of bits) and level of image quality. R-D analysis unit 64 outputs the selected predictive data, which may be subtracted from the video block being coded via adder 48 (FIG. 2). As discussed above, in addition to analyzing which type of predicted data generates the best results, R-D analysis unit 64 also can analyze which size of coded unit and which type of partitioning for the coded unit generates the best results.

Syntax elements may be used to inform a decoder of the manner or method that motion compensation unit 35 used to encode the data, and hence what manner and method the decoder should use to generate the weighted predictive data. According to the present disclosure, the syntax elements may include separate syntax elements for signaling a partition size and a prediction direction. If bi-directional prediction is selected, the syntax elements, for example, may further indicate whether default, implicit, or explicit weighted prediction should be used. If explicit weighted prediction should be used, the syntax elements may further identify the weight factors and the offset, which again may be weight factors and offset associated with explicit weighted prediction, or may be weight factors that were actually defined by default weighted prediction unit 54 or implicit weighted prediction unit 56 with the addition of offset from offset calculation unit 62.

Figure 4:
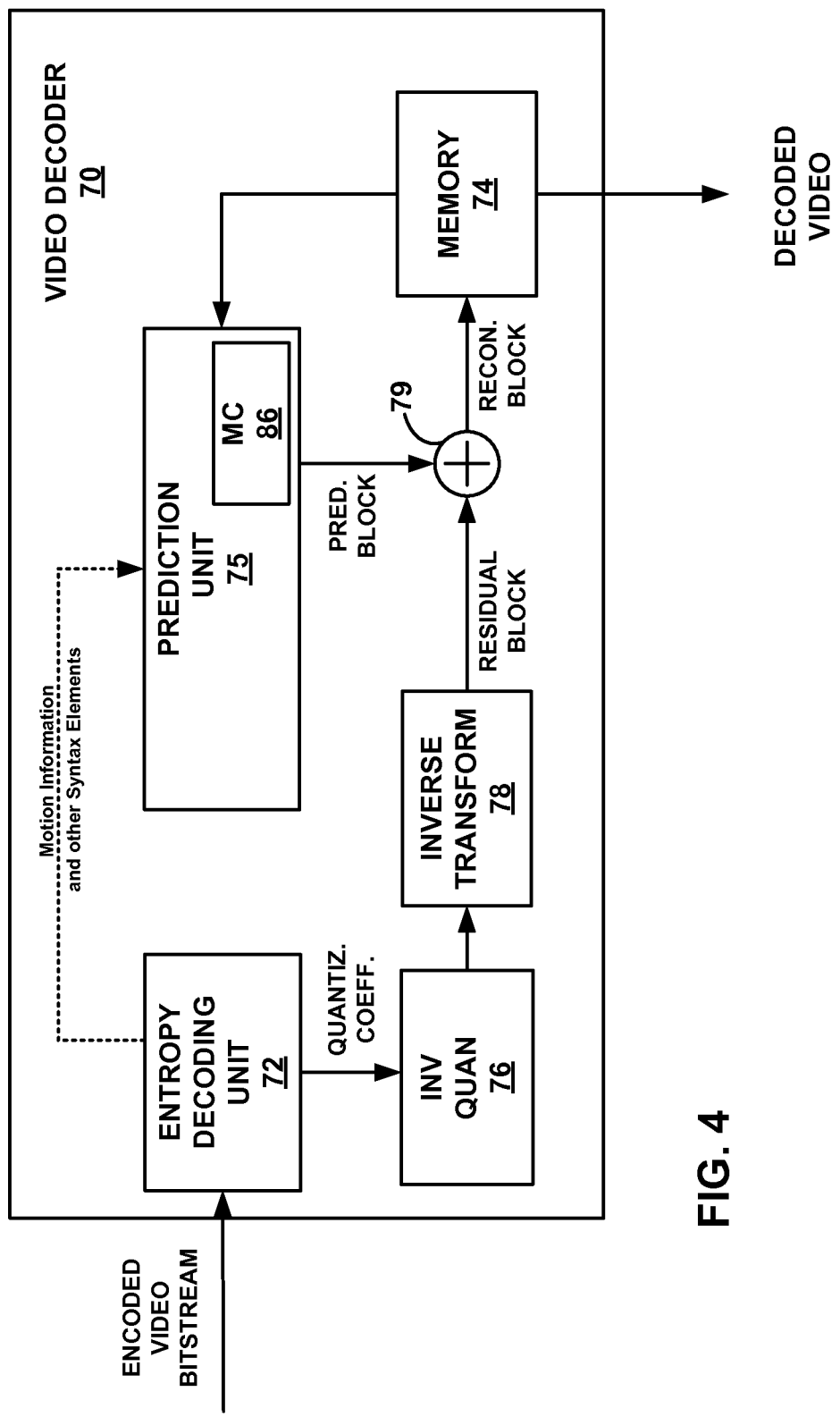
FIG. 4 is a block diagram illustrating an example of a video decoder that may perform techniques consistent with this disclosure.

FIG. 4 is a block diagram illustrating an exemplary video decoder 70, which may perform the reciprocal decoding techniques to the encoding techniques described above. Video decoder 70 may include an entropy decoding unit 72, a prediction unit 75, an inverse quantization unit 76, an inverse transform unit 78, a memory 74 and adder 79. Prediction unit 75 may include a motion compensation (MC) unit 88, as well as spatial prediction components, which are not shown for simplicity and ease of illustration.

Video decoder 70 may receive encoded video data, and two or more separate syntax elements that indicate a partition size and a prediction direction. Based on the two or more separate syntax elements, MC unit 86 of prediction unit 75 may generate weighted prediction data that depends on two or more lists of data, as described herein. Video decoder 70 can decode the video data using the weighted prediction data, e.g., by invoking adder 79 to add the weighted prediction data (e.g., a prediction block) to residual data (e.g., a residual block).

In general, entropy decoding unit 72 receives an encoded bitstream and entropy decodes the bitstream to generate quantized coefficients, motion information and other syntax elements. According to techniques of this disclosure, the other syntax elements can include two or more separate syntax elements signaling a partition size and a prediction direction. The motion information (e.g., motion vectors) and other syntax are forwarded to prediction unit 75 for use in generating the predictive data. Prediction unit 75 performs bi-directional prediction consistent with this disclosure, and possibly implementing default, implicit or explicit weighted prediction according to the received syntax elements. The syntax elements may identify the type of weighted prediction that to be used, coefficients and offset if explicit weighted prediction to be used, and as discussed previously, may include two or more separate syntax elements identifying a partition size and a prediction direction.

The quantized coefficients are sent from entropy decoding unit 72 to inverse quantization unit 76, which performs inverse quantization. Inverse transform unit 78 then inverse transforms the de-quantized coefficients back to the pixel domain to generate a residual block. Adder 79 combines the prediction data (e.g., a prediction block) generated by prediction unit 75 with the residual block from inverse transform unit 78 to create a reconstructed video block, which may be stored in memory 74 and/or output from video decoder 70 as decoded video output.

Figure 5:
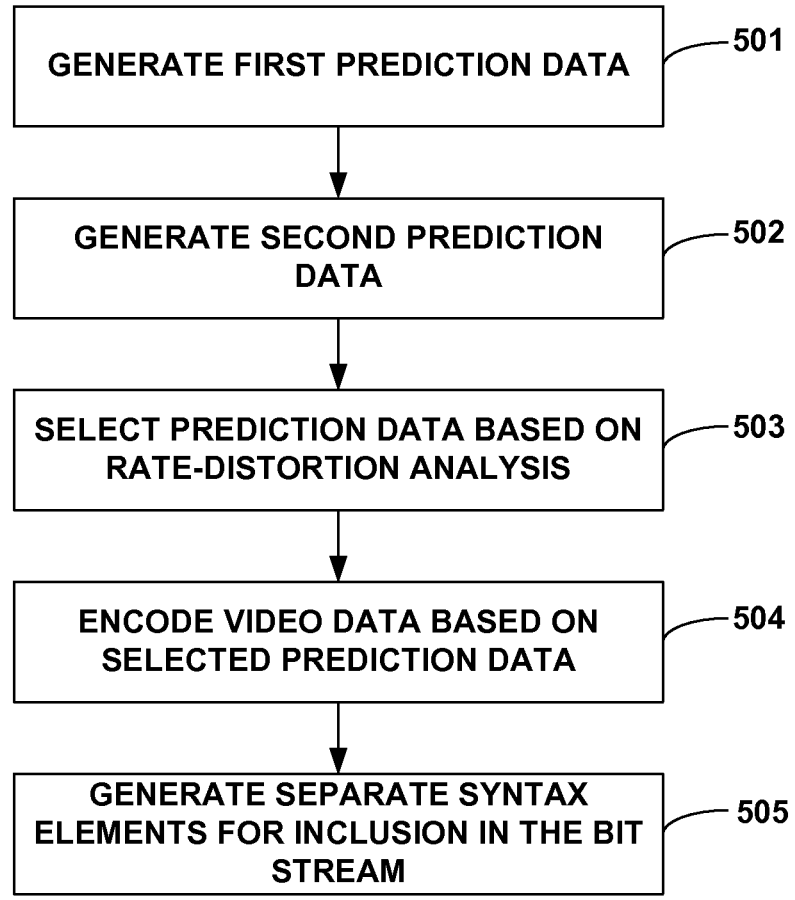
FIG. 5 is a flow chart illustrating an example of a process performed by a video encoder consistent with this disclosure.

FIG. 5 is a flow chart illustrating an example process performed by a video encoder consistent with this disclosure. FIG. 5 will be described from the perspective of video encoder 50 of FIG. 2. As shown in FIG. 5, motion compensation unit 35 generates first weighted prediction data (501), and generates second weighted prediction data (502). Motion compensation unit 35 then selects prediction data from the first and second weighted prediction data based on a rate-distortion analysis (503). In particular, motion compensation unit 35 may determine cost metrics for the first and second weighted prediction data that quantify and balance the encoding rate and the encoding quality associated with the first and second weighted prediction data, and may select the prediction data with the lowest cost in terms of both rate and distortion. Video encoder 50 can then encode video data based on the selected prediction data (504). For example, video encoder 50 may invoke adder 48 to subtract the selected prediction data from the video data being coded, and then invoke transform unit 38 for transform, quantization unit 40 for quantization and entropy coding unit 46 for entropy coding of quantized and transformed residual coefficients. In this case, motion compensation unit 35 may generate two or more, separate syntax elements to indicate a partition size and a prediction direction for the prediction data, and may forward such syntax elements to entropy coding unit 46 for inclusion in the coded bitstream (505). The process of FIG. 5 can be performed for a plurality of B-video blocks within a slice or frame or other series of video blocks, and may also be performed for sub-blocks of B-video blocks. For example, the process of FIG. 5 could be performed for any of an LCU, CU, or PU.

Figure 6:
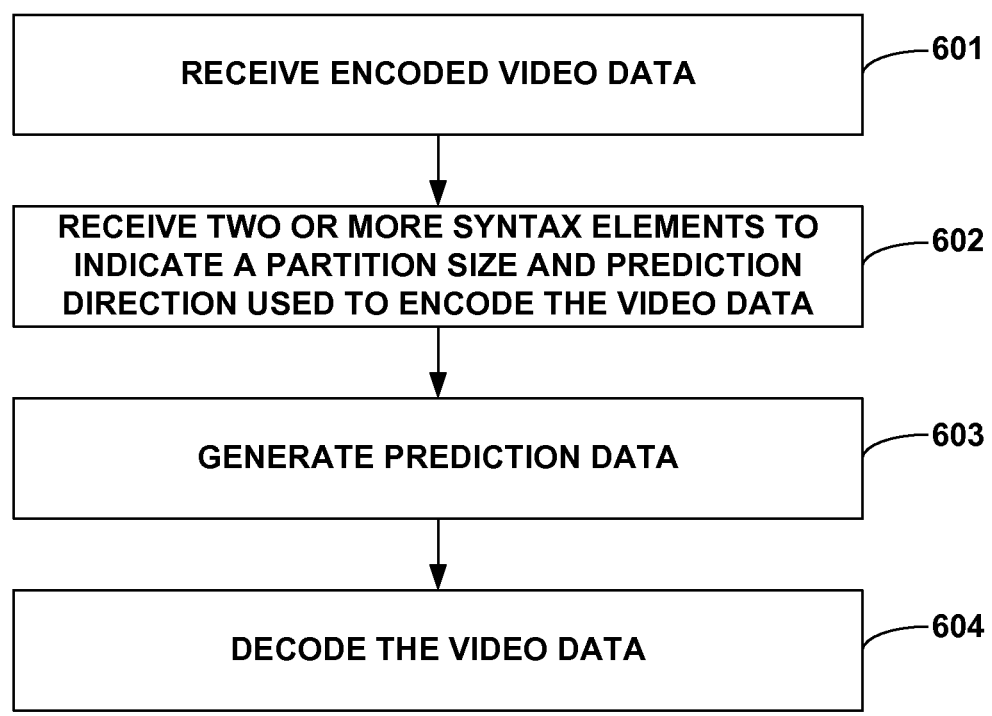
FIG. 6 is a flow chart illustrating an example of a process performed by a video decoder consistent with this disclosure.

FIG. 6 is a flow chart illustrating an example process performed by a video decoder consistent with this disclosure. FIG. 6 will be described from the perspective of video decoder 70 of FIG. 4. As shown in FIG. 6, video decoder receives encoded video data (601), and receives two or more separate syntax elements that indicate a partition size and a prediction direction that was used to encode the video data (602). In particular, entropy decoding unit 72 may receive an encoded bitstream that includes the video data and the two or more separate syntax elements. Following entropy decoding, entropy decoding unit 72 may output the video data as quantized transform coefficients, which are inverse quantized by unit 76 and inverse transformed by unit 78. Entropy decoding unit 72 may output syntax elements to prediction unit 75, which includes the two or more separate syntax elements that indicate a partition size and a prediction direction that was used to encode the video data, motion vectors and possibly other syntax.

Prediction unit 75 invokes motion compensation unit 86 for block based predictive decoding. In doing so, motion compensation unit 86 generates weighted prediction data based on the two or more separate syntax elements indicating the partition size and the prediction direction (603). Video decoder 70 can then decode the video data using the weighted prediction data (604). In particular, video decoder 70 may invoke adder 79 to combine weighted prediction data (e.g., a prediction block) with residual video data (e.g., a residual block) in order to generate a reconstruction of the video data (e.g., a reconstructed video block). The process of FIG. 6 can be performed for a plurality of B-video blocks within a slice or frame or other series of video blocks, and may also be performed for sub-blocks of B-video blocks. For example, the process of FIG. 5 could be performed for any of an LCU, CU, or PU.

The techniques of this disclosure may be implemented in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various embodiments of the invention have been described. These and other embodiments are within the scope of the following claims.

The invention claimed is:

1. A method of encoding a bi-directional video block (B-video block), the method comprising:
   generating first prediction data for the B-video block;
   generating second prediction data for the B-video block;
   selecting one of the first prediction data and second prediction data based on one or more rate-distortion metrics;
   based on the selected prediction data, generating a first syntax element indicative only of a partition size for the B-video block, wherein the partition size is equal to either N×N, N×N/2, N/2×N, or N/2×N/2, wherein N is the dimension size, in pixels, of the B-video block;
   based on the selected prediction data, generating a second syntax element separate from the first syntax element and indicative only of a prediction direction for a partition of the B-video block, wherein the prediction direction is selected from a group of prediction directions consisting of a first list, a second list, and both the first list and the second list;
   performing a first entropy encoding process on the first syntax element, wherein performing the first entropy encoding process on the first syntax element comprises performing a context adaptive entropy encoding process based on first statistics;
   performing a second entropy encoding process on the second syntax element, wherein performing the second entropy encoding process on the second syntax element comprises performing the context adaptive entropy encoding process based on second, separate, statistics;
   outputting the first and second syntax elements; and
   encoding the B-video block based at least in part on values of the first and second syntax elements.

2. The method of claim 1, wherein selecting the one of the first prediction data and the second prediction data comprises evaluating the one or more rate-distortion metrics for each of the first prediction data and the second prediction data, and wherein the one or more rate-distortion metrics are based at least in part on an encoding rate and an encoding quality associated with each of the first prediction data and second prediction data.

3. The method of claim 1, wherein generating the first prediction data comprises determining a first motion vector and generating the second prediction data comprises determining a second motion vector.

4. The method of claim 3, wherein generating the second syntax element is based at least in part on which of the first motion vector or the second motion vector corresponds to the selected prediction data.

5. The method of claim 1, wherein generating the first prediction data comprises determining a first partition size and generating the second prediction data comprises determining a second partition size.

6. The method of claim 5, wherein generating the first syntax element is based at least in part on which of the first partition size or the second partition size corresponds to the selected prediction data.

7. The method of claim 1, wherein outputting the first and second syntax element comprises:
   outputting a first plurality of bits indicative of the first syntax element; and
   outputting a second plurality of bits indicative of the second syntax element, said first and second plurality of bits being independent of each other.

8. The method of claim 1, further comprising:
   based on the selected prediction data, generating a third syntax element indicative of a second prediction direction for a second partition of the B-video block.

9. A video encoder for encoding a bi-directional video block (B-video block), the video encoder comprising:
   a memory configured to store the B-video block; and
   a processor configured to:
      generate first prediction data for the B-video block and second prediction data for the B-video block;
      select one of the first prediction data and second prediction data to be included in the bitstream;
      generate a first syntax element indicative only of a partition size for the B-video block based on the selected prediction data, wherein the partition size is equal to either N×N, N×N/2, N/2×N, or N/2×N/2, wherein N is the dimension size, in pixels, of the B-video block, and to generate a second syntax element indicative only of a prediction direction for the B-video block based on the selected prediction data, wherein the prediction direction is selected from a group of prediction directions consisting of a first list, a second list, and both the first list and the second list;

perform a first entropy encoding process on the first syntax element, wherein to perform the first entropy encoding process on the first syntax element, the processor is configured to perform a context adaptive entropy encoding process based on first statistics;

perform a second entropy encoding process on the second syntax element, wherein to perform the second entropy encoding process on the second syntax element, the processor is configured to perform the context adaptive entropy encoding process based on second, separate, statistics;

output the first and second syntax elements; and encode the B-video block based at least in part on values of the first and second syntax elements.

10. The video encoder of claim 9, wherein the processor is further configured to select the one of the first prediction data and the second prediction data based on evaluating one or more rate-distortion metrics for each of the first prediction data and the second prediction data, and wherein the one or more rate-distortion metrics are based at least in part on an encoding rate and an encoding quality associated with each of the first prediction data and second prediction data.

11. The video encoder of claim 9, wherein to generate the first prediction data, the processor is further configured to determine a first motion vector and wherein to generate the second prediction data, the processor is further configured to determine a second motion vector.

12. The video encoder of claim 11, wherein the processor is configured to generate the second syntax element based at least in part on which of the first motion vector or the second motion vector corresponds to the selected prediction data.

13. The video encoder of claim 9, wherein to generate the first prediction data the processor is further configured to determine a first partition size and wherein to generate the second prediction data the processor is further configured to determine a second partition size.

14. The video encoder of claim 13, wherein the processor is configured to generate the first syntax element based at least in part on which of the first partition size or the second partition size corresponds to the selected prediction data.

15. The video encoder of claim 9, wherein to generate the first syntax element and the second syntax element, the processor is further configured to output a first plurality of bits indicative of the first syntax element, and to output a second plurality of bits indicative of the second syntax element, said first and second plurality of bits being independent of each other.

16. The video encoder of claim 9, wherein to generate the first syntax element and the second syntax element, the processor is further configured to generate a third syntax element indicative of a second prediction direction for a second partition of the B-video block, based on the selected prediction data.

17. A non-transitory computer-readable storage medium storing instructions that upon execution by one or more processors cause the one or more processors to perform encoding of a bi-directional video block (B-video block), the encoding comprising:

generating first prediction data for the B-video block;

generating second prediction data for the B-video block;

selecting one of the first prediction data and second prediction data based on one or more rate-distortion metrics;

generating a first syntax element indicative only of a partition size for the B-video block based on the selected prediction data, wherein the partition size is equal to either N×N, N×N/2, N/2×N, or N/2×N/2, wherein N is the dimension size, in pixels, of the B-video block;

generating a second syntax element separate from the first syntax element and indicative only of a prediction direction for a partition of the B-video block based on the selected prediction data, wherein the prediction direction is selected from a group of prediction directions consisting of a first list, a second list, and both the first list and the second list;

performing a first entropy encoding process on the first syntax element, wherein performing the first entropy encoding process on the first syntax element comprises performing a context adaptive entropy encoding process based on first statistics;

performing a second entropy encoding process on the second syntax element, wherein performing the second entropy encoding process on the second syntax element comprises performing the context adaptive entropy encoding process based on second, separate, statistics;

outputting the first and second syntax elements; and encoding the B-video block based at least in part on values of the first and second syntax elements.

18. The computer-readable storage medium of claim 17, wherein selecting the one of the first prediction data and the second prediction data comprises evaluating the one or more rate-distortion metrics for each of the first prediction data and the second prediction data, and wherein the one or more rate-distortion metrics are based at least in part on an encoding rate and an encoding quality associated with each of the first prediction data and second prediction data.

19. The computer-readable storage medium of claim 17, wherein generating the first prediction data comprises determining a first motion vector and generating the second prediction data comprises determining a second motion vector.

20. The computer-readable storage medium of claim 19, wherein generating the second syntax element is based at least in part on which of the first motion vector or the second motion vector corresponds to the selected prediction data.

21. The computer-readable storage medium of claim 17, wherein generating the first prediction data comprises determining a first partition size and generating the second prediction data comprises determining a second partition size.

22. The computer-readable storage medium of claim 21, wherein generating the first syntax element is based at least in part on which of the first partition size or the second partition size corresponds to the selected prediction data.

23. The computer-readable storage medium of claim 17, wherein outputting the first and second syntax element comprises:

outputting a first plurality of bits indicative of the first syntax element; and outputting a second plurality of bits indicative of the second syntax element, said first and second plurality of bits being independent of each other.

24. The computer-readable storage medium of claim 17, further comprising:

based on the selected prediction data, generating a third syntax element indicative of a second prediction direction for a second partition of the B-video block.

25. A device for encoding a bi-directional video block (B-video block), the device comprising:

means for generating first prediction data for the B-video block;

means for generating second prediction data for the B-video block;

means for selecting one of the first prediction data and second prediction data based on one or more rate-distortion metrics;

means for generating a first syntax element indicative only of a partition size for the B-video block based on the selected prediction data, wherein the partition size is equal to either N×N, N×N/2, N/2×N, or N/2×N/2, wherein N is the dimension size, in pixels, of the B-video block;

means for generating a second syntax element separate from the first syntax element and indicative only of a prediction direction for a partition of the B-video block based on the selected prediction data, wherein the prediction direction is selected from a group of prediction directions consisting of a first list, a second list, and both the first list and the second list;

means for performing a first entropy encoding process on the first syntax element, wherein the means for performing the first entropy encoding process on the first syntax element comprises means for performing a context adaptive entropy encoding process based on first statistics;

means for performing a second entropy encoding process on the second syntax element, wherein the means for performing the second entropy encoding process on the second syntax element comprises means for performing the context adaptive entropy encoding process based on second, separate, statistics;

means for outputting the first and second syntax elements; and means for encoding the B-video block based at least in part on values of the first and second syntax elements.

26. The device of claim 25, wherein the means for selecting the one of the first prediction data and the second prediction data comprise means for evaluating the one or more rate-distortion metrics for each of the first prediction data and the second prediction data, and wherein the one or more rate-distortion metrics are based at least in part on an encoding rate and an encoding quality associated with each of the first prediction data and second prediction data.

27. The device of claim 25, wherein the means for generating the first prediction data comprise means for determining a first motion vector and the means for generating the second prediction data comprise means for determining a second motion vector.

28. The device of claim 27, wherein the means for generating the second syntax element generate the second syntax element based at least in part on which of the first motion vector or the second motion vector corresponds to the selected prediction data.

29. The device of claim 25, wherein the means for generating the first prediction data comprise means for determining a first partition size and the means for generating the second prediction data comprise means for determining a second partition size.

30. The device of claim 29, wherein the means for generating the first syntax element generate the first syntax element based at least in part on which of the first partition size or the second partition size corresponds to the selected prediction data.

31. The device of claim 25, wherein the means for outputting the first syntax element and the second syntax element are configured to output a first plurality of bits indicative of the first syntax element; and output a second plurality of bits indicative of the second syntax element, said first and second plurality of bits being independent of each other.

32. The device of claim 25, further comprising:
means for generating a third syntax element indicative of a second prediction direction for a second partition of the B-video block based on the selected prediction data.

33. A method of decoding a bi-directional video block (B-video block), the method comprising:

receiving, in encoded video data, a first syntax element indicative only of a partition size used to encode the B-video block and a second syntax element indicative only of a prediction direction used to encode the B-video block, wherein the first syntax element is separate from the second syntax element, wherein the partition size is equal to either N×N, N×N/2, N/2×N, or N/2×N/2, wherein N is the dimension size, in pixels, of the B-video block, and wherein the prediction direction is selected from a group of prediction directions consisting of a first list, a second list, and both the first list and the second list;

performing a first entropy decoding process on the first syntax element, wherein performing the first entropy decoding process on the first syntax element comprises performing a context adaptive entropy decoding process based on first statistics;

performing a second entropy decoding$_{process}$ on the second syntax element, wherein performing the second entropy decoding process on the second syntax element comprises performing the context adaptive entropy decoding process based on second, separate, statistics; and decoding the B-video block based at least in part on the received first syntax element and the second syntax element.

34. The method of claim 33, wherein decoding the B-video block comprises generating prediction data based at least in part on the first syntax element and the second syntax element.

35. The method of claim 33, wherein receiving the first syntax element and the second syntax element comprises:

receiving a first plurality of bits indicative of the first syntax element; and receiving a second plurality of bits indicative of the second syntax element, said first and second plurality of bits being independent of each other.

36. The method of claim 33, further comprising:
receiving, in the encoded video data, a third syntax element indicative of a second prediction direction used to encode the B-video block.

37. A video decoder for decoding a bi-directional video block (B-video block), the video decoder comprising:
a memory configured to store encoded video data; and
a processor configured to:
receive the encoded video data, the encode video data comprising a first syntax element indicative only of a partition size used to encode the B-video block and a second syntax element indicative only of a prediction direction used to encode the B-video block, wherein the first syntax element is separate from the second syntax element, wherein the partition size is equal to either N×N, N×N/2, N/2×N, or N/2×N/2, wherein N is the dimension size, in pixels, of the B-video block, and wherein the prediction direction is selected from a group of prediction directions consisting of a first list, a second list, and both the first list and the second list;

perform a first entropy decoding process on the first syntax element, wherein performing the first entropy decoding process on the first syntax element comprises performing a context adaptive entropy decoding process based on first statistics;

perform a second entropy decoding process on the second syntax element, wherein performing the second entropy decoding process on the second syntax element comprises performing the context adaptive entropy decoding process based on second, separate, statistics; and decode the B-video block based on the received first syntax element and the second syntax element.

38. The video decoder of claim 37, wherein the processor is further configured to generate prediction data based at least in part on the first syntax element and the second syntax element.

39. The video decoder of claim 37, wherein the processor is configured to receive a first plurality of bits indicative of the first syntax element, and to receive a second plurality of bits indicative of the second syntax element, the first and second plurality of bits being independent of each other.

40. The video decoder of claim 37, wherein the processor is further configured to receive a third syntax element indicative of a second prediction direction for a second partition of the B-video block.

41. A non-transitory, computer-readable storage medium storing instructions that upon execution by one or more processors cause the one or more processors to perform decoding of a bi-directional video block (B-video block), the decoding comprising:

receiving encoded video data;

receiving, in the encoded video data, a first syntax element indicative only of a partition size used to encode the B-video block and a second syntax element indicative only of a prediction direction used to encode the B-video block, wherein the first syntax element is separate from the second syntax element, wherein the partition size is equal to either N×N, N×N/2, N/2×N, or N/2×N/2, wherein N is the dimension size, in pixels, of the B-video block, and wherein the prediction direction is selected from a group of prediction directions consisting of a first list, a second list, and both the first list and the second list;

performing a first entropy decoding process on the first syntax element, wherein performing the first entropy decoding process on the first syntax element comprises performing a context adaptive entropy decoding process based on first statistics;

performing a second entropy decoding process on the second syntax element, wherein performing the second entropy decoding process on the second syntax element comprises performing the context adaptive entropy decoding process based on second, separate, statistics; and decoding the B-video block based at least in part on the received first syntax element and the second syntax element.

42. The computer-readable storage medium of claim 41, wherein decoding the B-video block comprises generating prediction data based at least in part on the first syntax element and the second syntax element.

43. The computer-readable storage medium of claim 41, wherein receiving the first syntax element and the second syntax element comprises:

receiving a first plurality of bits indicative of the first syntax element; and receiving a second plurality of bits indicative of the second syntax element, said first and second plurality of bits being independent of each other.

44. The computer-readable storage medium of claim 41, wherein the decoding further comprises:

receiving, in the encoded video data, a third syntax element indicative of a second prediction direction used to encode the B-video block.

45. A device for decoding a bi-directional video block (B-video block), the device comprising:

means for receiving encoded video data;

means for receiving a first syntax element indicative only of a partition size used to encode the B-video block and a second syntax element indicative only of a prediction direction used to encode the B-video block, wherein the first syntax element is separate from the second syntax element, wherein the partition size is equal to either N×N, N×N/2, N/2×N, or N/2×N/2, wherein N is the dimension size, in pixels, of the B-video block, and wherein the prediction direction is selected from a group of prediction directions consisting of a first list, a second list, and both the first list and the second list;

means for performing a first entropy decoding process on the first syntax element, wherein performing the first entropy decoding process on the first syntax element comprises performing a context adaptive entropy decoding process based on first statistics;

means for performing a second entropy decoding process on the second syntax element, wherein performing the second entropy decoding process on the second syntax element comprises performing the context adaptive entropy decoding process based on second, separate, statistics; and means for decoding the B-video block based at least in part on the received first syntax element and the second syntax element.

46. The device of claim 45, wherein the means for decoding the B-video block comprises means for generating prediction data based at least in part on the first syntax element and the second syntax element.

47. The device of claim 45, wherein the means for receiving the first syntax element and the second syntax element comprises:

means for receiving a first plurality of bits indicative of the first syntax element; and means for receiving a second plurality of bits indicative of the second syntax element, said first and second plurality of bits being independent of each other.

48. The device of claim 45, further comprising:

means for receiving a third syntax element indicative of a second prediction direction used to encode the B-video block.

49. The video encoder of claim 9, further comprising a camera configured to generate pixel data for the B-video block.

50. The video decoder of claim 37, further comprising a display configured to display the B-video block.

51. The method of claim 1, wherein the context adaptive entropy encoding process comprises one of content adaptive variable length encoding, or context adaptive binary arithmetic encoding.

52. The method of claim 33, wherein the context adaptive entropy decoding process comprises one of content adaptive variable length decoding, or context adaptive binary arithmetic decoding.

53. The video encoder of claim 9, wherein the context adaptive entropy encoding process comprises one of content adaptive variable length encoding, or context adaptive binary arithmetic encoding.

54. The video decoder of claim 37, wherein the context adaptive entropy decoding process comprises one of content adaptive variable length decoding, or context adaptive binary arithmetic decoding.

\* \* \* \* \*